United States Patent [19]
Drori

[11] Patent Number: 4,642,182
[45] Date of Patent: Feb. 10, 1987

[54] MULTIPLE-DISC TYPE FILTER WITH EXTENSIBLE SUPPORT

[76] Inventor: Mordeki Drori, 89 Zahal Street, Kiron, Israel

[21] Appl. No.: 709,376

[22] Filed: Mar. 7, 1985

[51] Int. Cl.$^4$ ............................................. B01D 29/46
[52] U.S. Cl. .................................. 210/232; 210/314; 210/350; 210/357; 210/488
[58] Field of Search ............... 210/232, 236, 237, 238, 210/314, 323.1, 350, 357, 407, 483, 488, 444

[56] References Cited

U.S. PATENT DOCUMENTS

| | | | |
|---|---|---|---|
| 1,719,346 | 7/1929 | Thompson | 210/357 |
| 1,797,399 | 3/1931 | Boulade | 210/488 |
| 1,852,873 | 4/1932 | Berger | 210/357 |
| 2,330,945 | 10/1943 | Becker | 210/444 |
| 2,365,525 | 12/1944 | Cox | 210/357 |
| 2,374,756 | 5/1945 | Kisch et al. | 210/232 |
| 2,757,802 | 8/1956 | Schmid | 210/237 |
| 3,529,726 | 9/1970 | Keenan | 210/232 |
| 4,251,374 | 2/1981 | Cunningham | 210/232 |
| 4,435,287 | 3/1984 | Sumimoto | 210/232 |

Primary Examiner—Richard V. Fisher
Assistant Examiner—Wanda L. Millard
Attorney, Agent, or Firm—Cushman, Darby & Cushman

[57] ABSTRACT

A multiple-disk type filter including a stack of filter disks disposed in a housing and an extensible support for the stack of filter disks, the extensible support including first, second, third and fourth base elements and a multiplicity of rod members joining the first and second base elements in sliding relationship, a first plurality of the rod members being fixedly attached to the first base element and being arranged for slidable supporting engagement with the second base element and a second plurality of the rod members being fixedly attached to the second base element and being arranged for slidable supporting engagement with the first base element.

14 Claims, 7 Drawing Figures

MULTIPLE-DISC TYPE FILTER WITH EXTENSIBLE SUPPORT

FIELD OF THE INVENTION

The present invention relates to filters and particularly to multiple-disc type filters useful in filtering particles from water and in many other applications.

BACKGROUND OF THE INVENTION

Multiple-disc type filters generally include a housing in which the filter body within the housing is in the form of a stack of like, centrally-apertured, filter discs having grooved side faces defining filtering channels between the adjacent discs in the stack. In some applications of such filters, the outer face of the stack of filter discs constitutes the upstream side of the filter, in which case the fluid being filtered passes from the outer face to the inner face of the stack. In other applications of such filters, the inner face of the stack constitutes the upstream side of the filter, in which case the fluid being filtered passes from the inner to the outer face through the filter stack.

Multiple-disc type filters have a number of advantages over other known types of filters, for example, the cylindrical-screen type filter. The multiple-disc filter has a larger capacity for removing and retaining dirt particles, since these may be retained also between the side faces of the discs, in addition to being retained on the upstream surface as in the cylindrical-screen type filter. Another advantage in the multiple-disc filter is that it is not as easily ruptured as the screen type and therefore there is less danger that because of a malfunction, unfiltered water may pass through and clog sprinklers or other devices downstream of the filter. The latter advantage is particularly important in self-cleaning filters wherein the upstream face of the filter is cleaned by a cleaning nozzle which, in the case of a screen-type filter, may rupture the screen by particles becoming wedged between the cleaning nozzle and the filter screen.

The stack of discs in the multiple-disc type filter has hitherto been supported internally by a cylinder pierced with holes so as to allow the fluid being filtered to flow therethrough. Since the stack is held in position by fastening members at each end, as for example by annular screws which move about threaded extensions of the cylinder at each end thereof, the spreading of the discs for cleaning can be a laborious process. If it is desired not to remove the discs from the stack for cleaning, an in-line extension of the central cylinder is required. Such extension adds to the size and cost of the equipment and is not practical for non-in line systems.

SUMMARY OF THE INVENTION

The present invention relates to a novel form of support for the stack of discs in a multiple-disc type filter which overcomes the disadvantage of the cylindrical kind of support.

There is thus provided in accordance with an embodiment of the present invention, a multiple-disc type filter comprising a stack of filter disks disposed in a housing and an extensible support for the stack of filter disks, the extensible support including first and second base elements and a multiplicity of rod members joining the first and second base elements in sliding relationship, a first plurality of the rod members being fixedly attached to the first base element and being arranged for slidable supporting engagement with the second base element and a second plurality of the rod members being fixedly attached to the second base element and being arranged for slidable supporting engagement with the first base element.

According to a preferred embodiment of the invention, the base elements comprise first and second annuli disposed generally in parallel planes, each annulus being pierced perpendicularly to the planes by a number of corresponding holes such that a rod attached by one end to a hole in one annulus may slide through the corresponding hole in the other annulus, a plurality of rods in respect of each rod of which one end is fixedly engaged in alternate holes in said first annulus and the other end is slidingly engaged with the corresponding hole in said second annulus, and a plurality of rods in respect of each rod of which one end is fixedly engaged in alternate holes in said second annulus and the other end is slidingly engaged with the corresponding hole in said first annulus, such that the annuli may be moved either closer together or farther apart by means of the sliding engagement of each rod attached to one annulus and passing through a corresponding hole in the other annulus.

Each annulus preferably contains originally an even number of holes, so that each such hole either has one of the the rods fixedly inserted therein or is free to slidingly engage a rod fixedly inserted into a corresponding hole in the other annulus. It is preferable for the holes to be evenly spaced from each other.

It will be appreciated that if each annulus contains six holes, then three rods will pass slidingly through alternate holes, and presuming that the holes are equidistant, and that the annuli are relatively close together, then the stack of filter discs will be supported symmetrically by three rods for all of its length, with the exception of the relatively short distance separating the annuli. In similar circumstances, but with eight holes, the stack of filter discs will be supported symmetrically by four rods for most of its length.

It is evident that because the stack of discs will be supported for the greater part of its length by a relatively small number of rods, the access of the fluid to the inner surface of the stack—regardless of whether this is upstream of down stream—is generally without interference. Moreover, the flushing of accumulated particles from the filtration unit may be carried out substantially without interference.

In a preferred embodiment of the invention, the stack support of the invention is used in situ with the rods short of their fully extended position. The advantage of this arrangement is that to wash the stack, the stack support may be further extended or even fully extended, so that the individual disks of the stack may be spaced from each other for rinsing, without requiring their removal from the stack support, a feature which is obviously not found with the inextensible cylindrical type of support.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
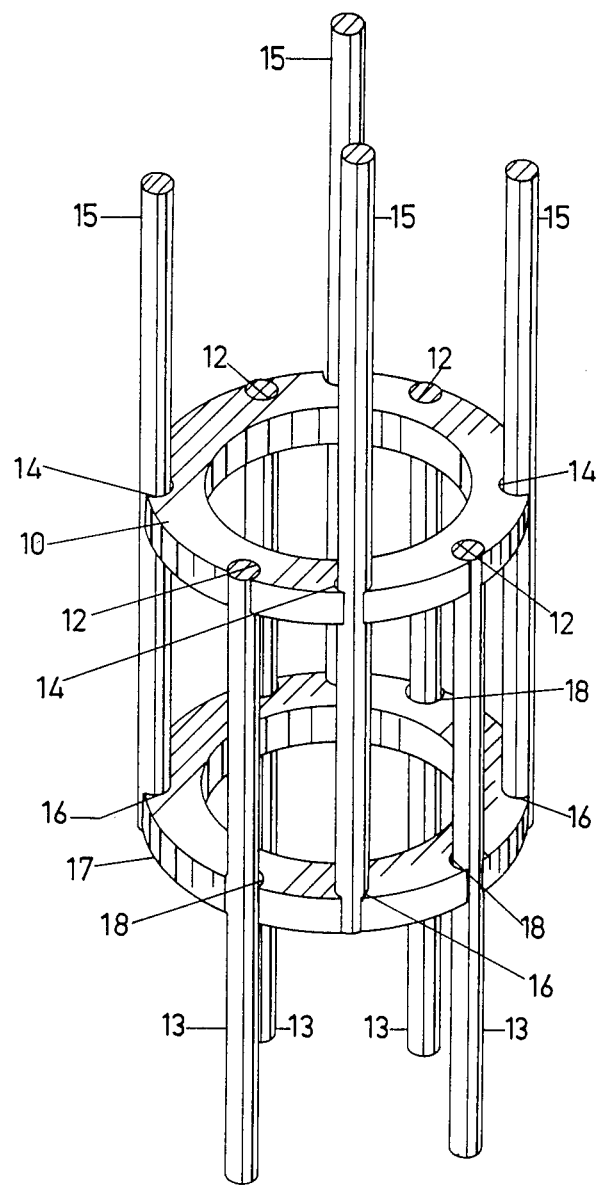
FIG. 1 is a perspective view of the stack support of the invention.

Reference is now made to FIG. 1, which is a simple pictorial representation of the filter stack support of the invention. A base element in the form of an annulus 10 has four holes 12 in which are fixedly inserted rods 13, and four holes 14 in which are slidingly engaged rods 15, which in turn are fixedly inserted into holes 16 in annulus 17. Annulus 17 also contains four holes 18 in which are slidingly engaged rods 13. It is appreciated that any suitable number of rods may be employed and that the number of rods 13 need not be equal to the number of rods 15.

Figure 2:
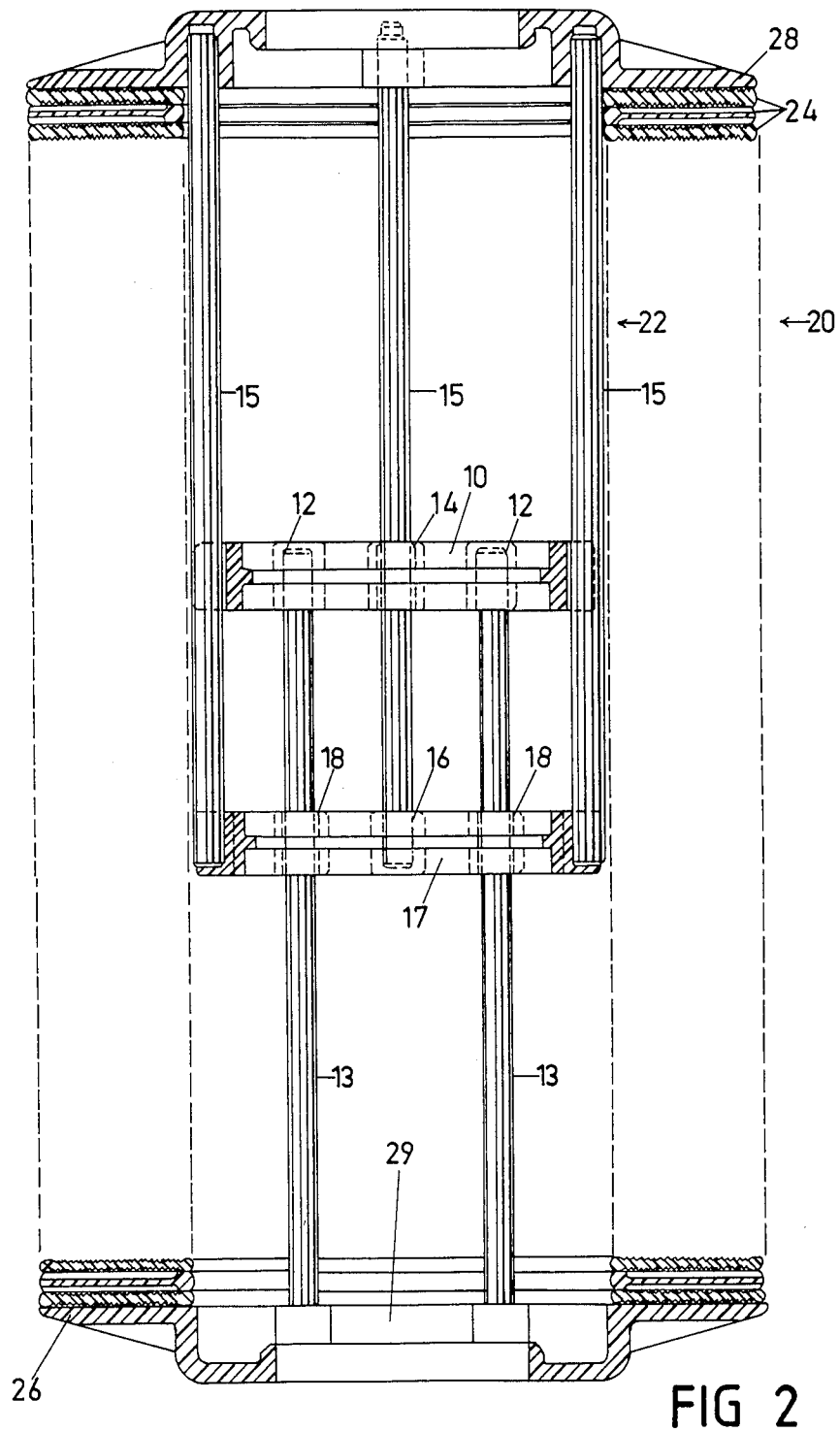
FIG. 2 is a partially cut away side view illustration of a filtration unit employing the stack support of FIG. 1.

FIG. 2 shows a filtration unit 20, employing a stack support 22, generally of the type described in connection with FIG. 1. A stack of annular filter disks 24 is supported on stack support 22. First and second end elements 26 and 28 are rigidly attached to the free ends of respective rods 13 and 15 for retaining the filter disks on the support 22. In operation, fluid enters through aperture 29 and exits through the side of the stack of filter discs, or alternatively fluid enters through the side and exits through aperture 29. It is noted that by pulling end elements 26 and 28 apart, the base elements 10 and 17 are brought closer together and the axial distance available to the stack of disc elements is increased, so that the individual disks 24 can be separated for rinsing and flushing accumulated particulate matter therefrom, without requiring their removal from the support 22.

A preferred embodiment of a filter disk is described in U.S. patent application Ser. No. 647,093, filed Sept. 4, 1984, of the present inventor, the relevant disclosure of which is incorporated herein by reference.

Figure 3B:
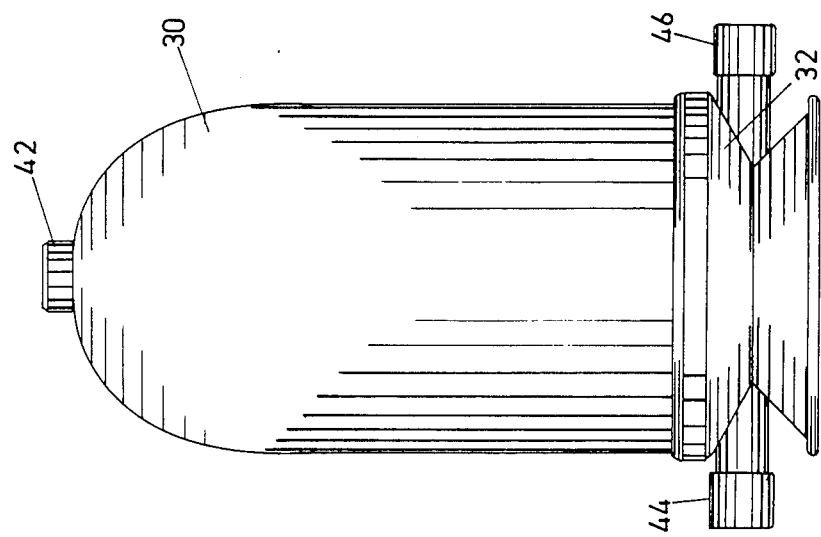
FIG. 3B is a side view illustration of the filter of FIG. 3A.
Figure 3A:
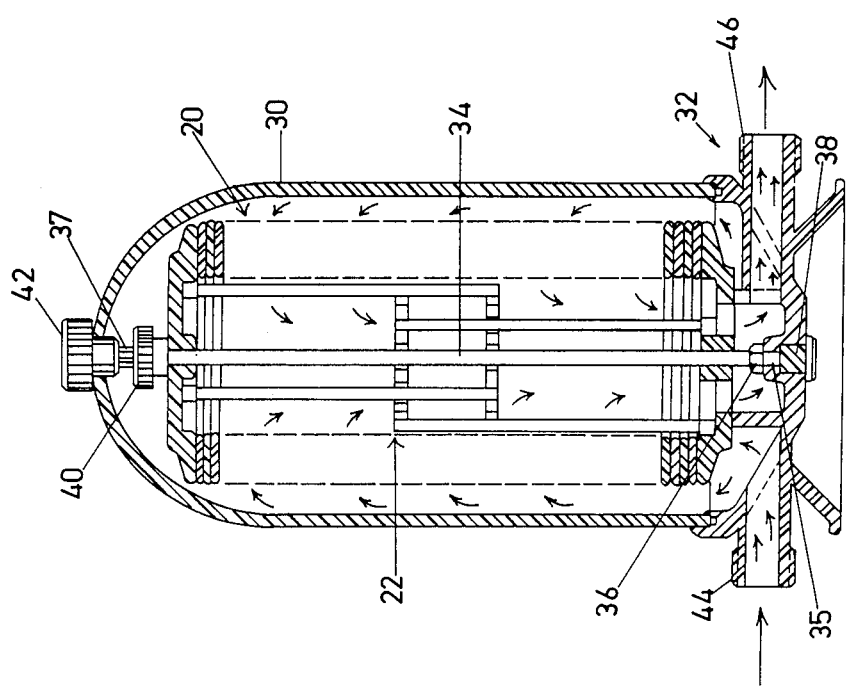
FIG. 3A is a sectional illustration of a filter employing the apparatus of the type shown in FIGS. 1 and 2.

Reference is now made to FIGS. 3A and 3B which illustrate a filter employing a filter support 22 of the type described in connection with FIGS. 1 and 2. The filter includes a generally bell-shaped housing 30, which is mounted on a mounting base 32. A filtration unit 20 of the type described in connection with FIG. 2 is disposed within housing 30.

A central securing rod 34, having first and second threaded ends 35 and 37, is secured to base 32 at threaded end 35 by means of internally threaded nuts 36 and 38. A nut 40, threaded at end 37, secures the filtration unit 20 onto base 32 and maintains the filtration unit in its unextended orientation for filtering operation. An additional nut 42, secures housing 30 onto base 32.

In the illustrated embodiment, base 32 defines a liquid inlet 44 which communicates with the outer cylindrical surface of the filtration unit and a liquid outlet 46 which communicates with the inner cylindrical surface of the filtration unit. The arrows appearing inFIG. 3A indicate the flow of liquid through the unit. It is appreciated that base 32 may readily be modified to provide an oppsitely directed flow or may be formed with a movable baffle or baffles to permit selection of the direction of flow.

Figure 4A:
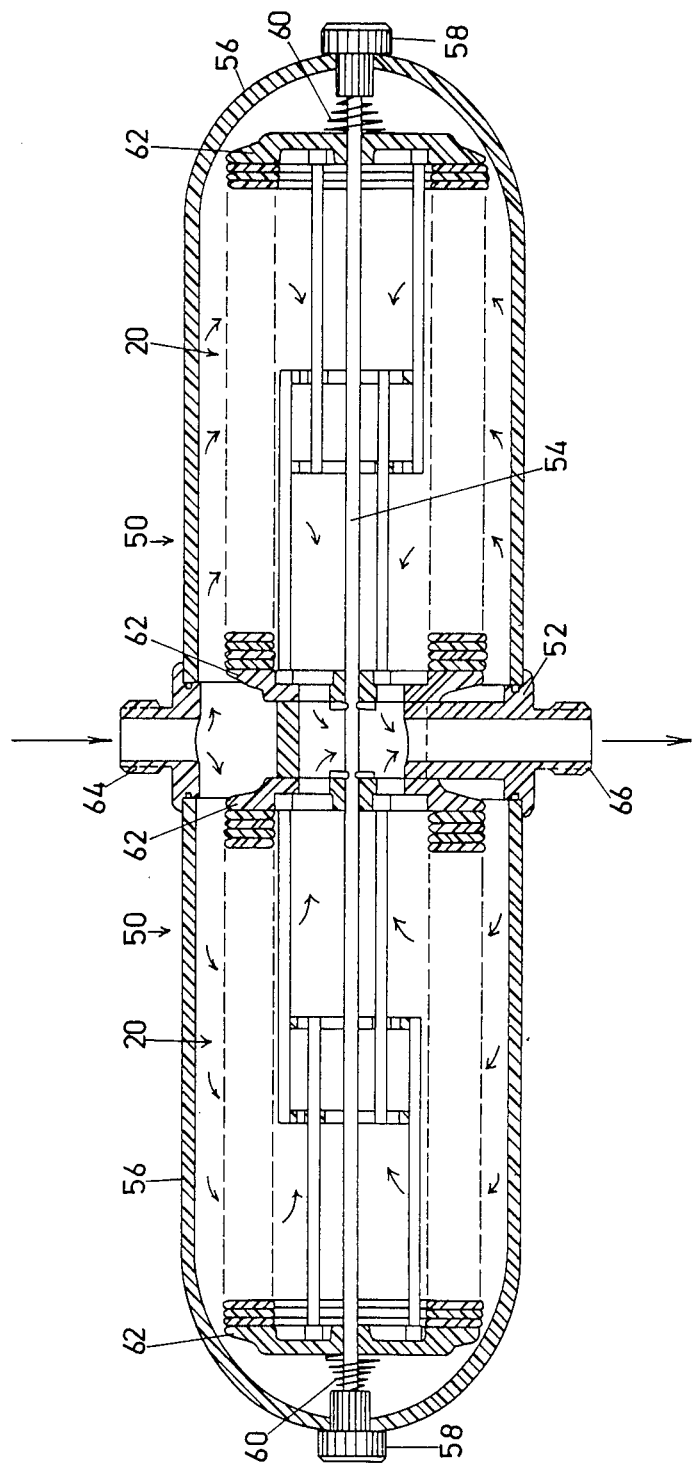
FIGS. 4A and 4B are respective sectional and pictorial illustrations of a filter which has approximately double the capacity of the filter shown in FIG. 3A.
Figure 4B:
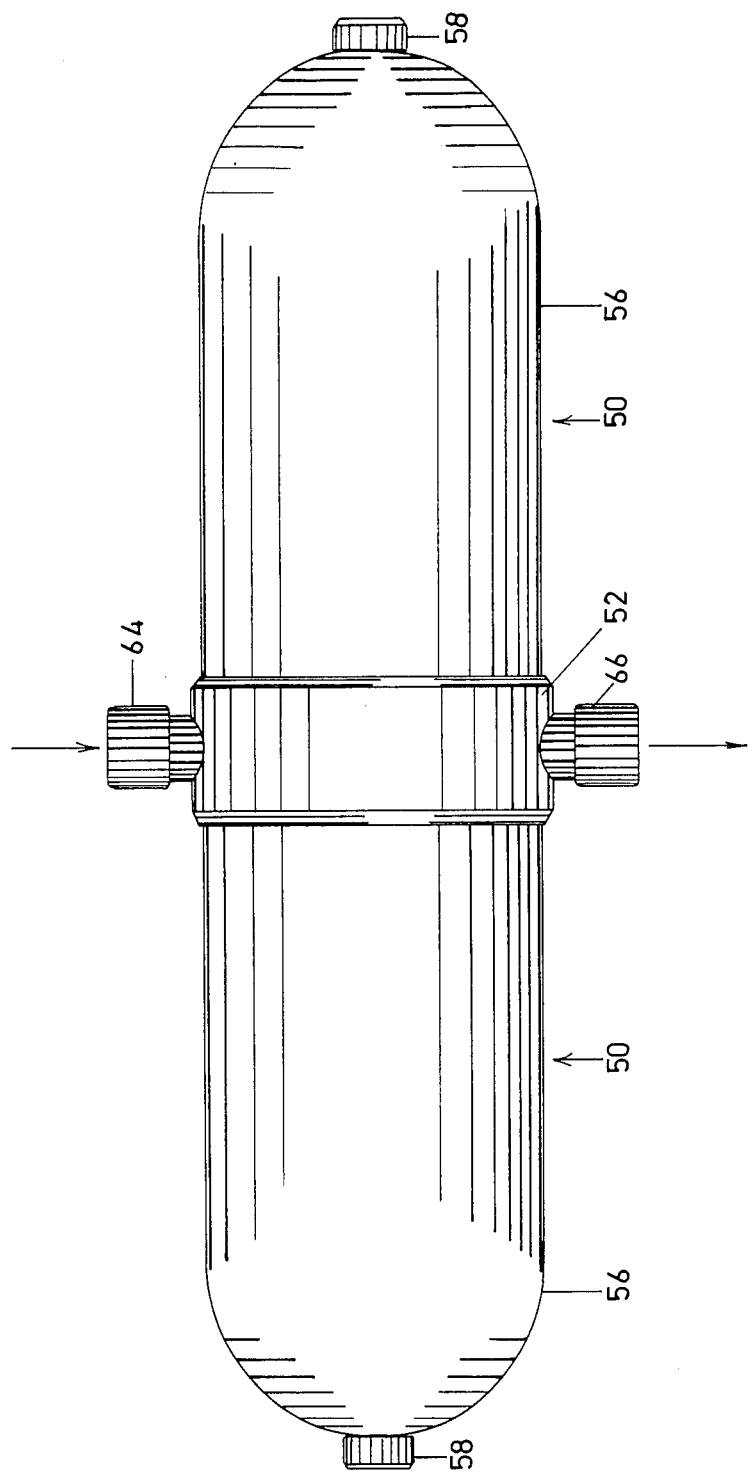

Reference is now made to FIGS. 4A and 4B which illustrate a double capacity filter employing the filtration units of the type described hereinabove in connection with FIG. 2. In principle, two units 50, each generally of the type illustrated in FIGS. 3A and 3B are placed end to end in communication with a common base 52. A single rod 54, threaded at both ends, traverses the entire unit and is operative in cooperation with a pair of threaded nuts 58 to secure the individual housing elements 56 to base 52.

Filtration units 20 are mounted onto base 52 by means of a pair of compression springs 60 which are seated on the axial inner facing surfaces of nuts 58 and on the axially outer facing surfaces of respective end members 62 of the filtration units 20. Compression springs 60 also act to hold the filtration units 20 in their non-extended positions for filtering operation.

It is a particular feature of the present invention that the filtration units 20 are held in their non-extended position under compression also by action of the fluid pressure inside the housing during operation which provides a net axial compressive force parallel to rod 54, forcing end members 62 together, during filtering operation. Since this axial force is not present when the housing is not under pressure, it is relatively easy to extend the filter support to its extended orientation for cleaning.

Since the axial compressive force is a function of the pressure difference across the stack of filter discs, an increase in liquid pressure, which might otherwise cause lower quality filtering due to pressurized forcing of particles through the filter to occur is balanced by increased pressure on the stack of discs, which acts to counteract this tendency.

Fluid to be filtered enters the apparatus at a port 64 and passes through the stacks of filter discs from the outer cylindrical surface inwardly to the central cavity defined by the discs and out through an outlet port 66, in directions indicated by the arrows appearing in FIG. 4a. Alternatively, an opposite or selectable flow may be provided.

It is particular feature of the present invention that the use of the securing rod 54 provides a balancing of forces produced by the liquid pressure within the housing and thus lowers the stresses applied to the base member 52.

Figure 5:
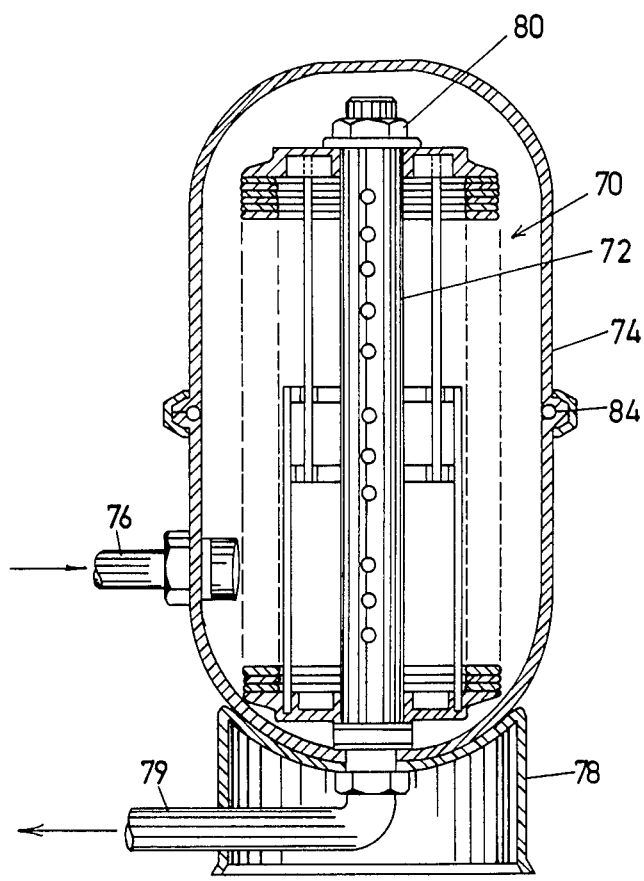
FIG. 5 is a sectional view of a filter including the support of the invention and a central egress tube.

Reference is now made to FIG. 5 which shows an alternative embodiment of filter employing a filtration unit 70 of the type described in connection with FIG. 2. Here the filtration unit 70 is disposed over an elongate pipe 72 having apertures formed therein for ingress of filtered fluid. The filtration unit 70 is enclosed by a two part housing 74, typically formed of fiberglass or a suitable plastic material and which is formed with a side inlet 76 for ingress of water to the outside cylindrical surface of the filtration unit 70. Elongate pipe 72 is mounted on a base 78 which is provided with an egress conduit 79 for filtered fluid. It is appreciated that in this and all other embodiment of the present invention illustrated herein, the indicated direction of flow of fluid therethrough may be changed by suitable modification of the flow paths.

A nut 80 threadably attached to the top of pipe 72 maintains the filtration unit 70 in it snon-extended orientation for filtering operation and secures the filtration unit 70 on base 78 and on housing 74. Housing 74 may be opened at seam 84 for access to filtration unit 70.

It will be appreciated by persons skilled in the art that the present invention is not limited to what has been shown and described with particularity hereinabove. Rather the scope of the present invention is defined only by the claims which follow.

I claim:

1. A multiple-disk type filter comprising:
   a housing;
   a stack of filter disks disposed ins aid housing; and
   an extensible support for said stack of filter disks, including first, second, third and fourth base elements and a multiplicity of rod members joining the first and second base elements in sliding relationship, a first plurality of the rod members being fixedly attached ot the first base element and being arranged for slidable supporting engagement with the second base element and a second plurality of rod members being fixedly attached to the second base element and being arranged for slidable supporting engagement with the first base element,
   said third base element being attached to said first plurality of rod members;
   said fourth base element being attached to said second plurality of rod members;
   said first and second base elements defining interior base elements and being located interiorly of said filter disks at an intermediate location along said stack;
   said third and fourth base elements defining exterior base elements and being located exteriorly of said stack; and
   said first and second pluralities of rod members being located interiorly of said stack of filter disks.

2. A filter according to claim 1 and also comprising a central securing element operative to secure said third and fourth base members in a fixed tightened orientation.

3. A filter according to claim 2 and wherein said central securing element is also operative to secure said housing over said stack of filter disks.

4. A filter according to claim 1 and wherein said first and second base elements comprise first and second annuli disposed generally in parallel planes, each annulus being pierced perpendicularly to said planes by a number of corresponding holes such that a rod member attached by one end to a hole in one annulus may slide through the corresponding hole in the other annulus, one end of each of said first plurality of rod members being fixedly engaged in alternate holes in said first annulus and slidingly engaged with the corresponding hole in said second annulus, and one end of each of said second plurality of rod members being fixedly engaged in alternate holes in said second annulus and slidingly engaged with the corresponding hole in said first annulus, such that the annuli may be moved either closer together or farther apart by means of the sliding engagement of each rod attached to one annulus and passing through a corresponding hole in the other annulus.

5. A filter according to claim 1 and also comprising a base member defining a fluid inlet and a fluid outlet.

6. A filtration unit for use in a multiple-disk type filter comprising
   a stack of filter disks; and
   an extensible support for said stack of filter disks, including first, second, third and fourth base elements and a multiplicity of rod members joining the first and second base elements in sliding relationship, a first plurality of the rod members being fixedly attached to the first base element and being arranged for slidable supporting engagement with the second base element and a second plurality of rod members being fixedly attached to the second base element and being arranged for slidable supporting engagement with the first base element,
   said third base element being attached to said first plurality of rod members;
   said fourth base element being attached to said second plurality of rod members;
   said first and second base elements defining interior base elements and being located interiorly of said filter disks at an intermediate location along said stack;
   said third and fourth base elements defining exterior base elements and being located exteriorly of said stack; and
   said first and second pluralities of rod members being located interiorly of said stack of filter disks.

7. A filtration unit according to claim 6 and wherein said first and second base elements comprise first and second annuli disposed generally in parallel planes, each annulus being pierced perpendicularly to said planes by a number of corresponding holes such that a rod member attached by one end to a hole in one annulus may slide through the corresponding hole in the other annulus, one end of each of said first plurality of rod members being fixedly engaged in alternate holes in said first annulus and slidingly engaged with the corresponding hole in said second annulus, and one end of each of said second plurality of rod members being fixedly engaged in alternate holes in said second annulus and slidingly engaged with the corresponding hole in said first annulus, such that the annuli may be moved either closer together or farther apart by means of the sliding engagement of each rod attached to one annulus and passing through a corresponding hole in the other annulus.

8. A filtration unit according to claim 6 and wherein a central securing element is operative to secure said filtration unit in a non-extended operating orientation.

9. A filter comprising:
   a base;
   first and second housing covers associated with said base;
   first and second stacks of filter disks disposed in respective first and second housing covers; and
   an extensible support for each said stack of filter disks, including first, second, third and fourth base elements and a multiplicity of rod members joining the first and second base elements in sliding relationship, a first plurality of the rod members being fixedly attached to the first base element and being arranged for slidable supporting engagement with the second base element and a second plurality of rod members being fixedly attached to the second base element and being arranged for slidable supporting engagement with the first base element,
   said third base element being attached to said first plurality of rod members;
   said fourth base element being attached to said second plurality of rod members;
   said first and second base elements defining interior base elements and being located interiorly of said filter disks at an intermediate location along said stack;
   said third and fourth base elements defining exterior base elements and being located exteriorly of said stack; and said first and second pluralities of rod members being located interiorly of said stack of filter disks.

10. A filter according to claim 9 and also comprising a central securing element extending through both of said first and second stacks and joining said stacks to said base.

11. A filter according to claim 10 and wherein said central securing element is also operative to secure said first and second stacks in non-extended operative orientations.

12. A filter according to claim 11 and also comprising spring means separating said first and second housing covers from said first and second stacks.

13. A filter according to claim 10 and wherein said central securing element is also operative to secure said first and second housing covers over said first and second stacks and with respect to said base.

14. A filter according to claim 10 and wherein said central securing element is operative to secure said third and fourth base elements of each stack in non-extended operative orientations.

* * * * *